United States Patent [19]

Lindner

[11] 4,012,873
[45] Mar. 22, 1977

[54] PROTECTIVE CAP FOR UNDERFLOOR ACCESS HOUSING

[75] Inventor: Robert G. Lindner, Sewickley, Pa.

[73] Assignee: H. H. Robertson Company, Pittsburgh, Pa.

[22] Filed: May 12, 1976

[21] Appl. No.: 685,682

[52] U.S. Cl. .................................... 52/99; 52/221; 174/49; 220/3.4

[51] Int. Cl.² ................... E04F 17/08; E04F 19/08; H02G 3/28

[58] Field of Search ............... 52/99, 221, 100, 20; 174/49, 48; 220/3.4, 3.5

[56] References Cited

UNITED STATES PATENTS

| | | | |
|---|---|---|---|
| 2,931,533 | 4/1960 | Wiesmann | 52/221 |
| 2,975,559 | 3/1961 | Hedgren | 52/98 |

FOREIGN PATENTS OR APPLICATIONS 117,735   9/1969   Norway ................................. 52/20

Primary Examiner—John E. Murtagh
Attorney, Agent, or Firm—Harry B. Keck; George E. Manias

[57] ABSTRACT

Protective covers for outlet openings of an underfloor access housing are provided to prevent ingress through the outlet opening of a subsequently poured layer of floor fill, such as concrete. The protective covers are enveloped by the floor fill and have upper peripheral edges spaced below the upper surface of the floor fill by up to 1¾ inches (44.5 mm). A release coating is interposed between the protective cover and the floor fill to facilitate separation of the covering floor fill.

3 Claims, 4 Drawing Figures

PROTECTIVE CAP FOR UNDERFLOOR ACCESS HOUSING

BACKGROUND OF THE INVENTION

1. Field of the Invention

This invention relates to an underfloor access housing providing access to a plurality of electrical services at one location in the floor, and more particularly to improved protective caps for outlet openings presented by the access housing.

2. Description of the Prior Art

A piston-cylinder assembly for gaining access to raceways through knockouts provided in the upper surface of the raceway is disclosed in U.S. Pat. No. 3,943,673 (LINDAHL et al). A method and structure utilizing a temporary plastic insert covered with adhesion-preventing coating, for forming a recess in a wall is disclosed in U.S. Pat. No. 3,418,767 (SEEGER). The cylinder of LINDAHL et al and the plastic insert of SEEGER present exposed surfaces flush with the surrounding concrete.

Protective caps for outlet openings presented by crossover ducts and underfloor access housings are well-known in the art. U.S. Pat. Nos. 2,975,559 (HEDGREN); 3,093,933 (SLINGLUFF) described protective caps for crossover ducts. U.S. Pat. Nos. 3,701,837 (FORK); 3,932,696 (FORK et al) describe protective caps for underfloor access housings.

In accordance with the above-identified prior art, a cup-shaped protective cap presents an upper peripheral edge which is spaced below the upper surface or screed line of the floor fill by a relatively short distance, for example one-eigth inch (3.2 mm). Activation of a particular cell is easily accomplished by breaking and removing the relatively thin covering layer of fill above the protective cap to expose the cap for removal.

Modern building constructions utilize composite beams and girders which because of their lighter section, depth and weight, have a tendency to deflect to a greater extent than non-composite beams and girders. For example, the dead load deflection at the center of a large bay can be as much as 1¾ to 2 inches. Because of the deflection, excess concrete may be poured to provide a substantially level floor surface. As a result, the thickness of the floor fill above the upper peripheral edge of the protective caps can exceed the normal one-eigth inch. The excess concrete over the protective caps is a detriment only when it is desired to remove the protective cap. That is, it is not possible to readily remove the covering layer of concrete from the protective cap. Instead, removal of the covering layer of concrete becomes an expensive, time-consuming operation. In some instances, the concrete at the periphery of the thus formed cavity spalls so badly that the periphery thereof must be regrouted. So far as is known, there is not presently a satisfactory economic way of removing the excess covering layer of concrete to gain access to the protective caps.

SUMMARY OF THE INVENTION

The principal object of this invention is to provide an improved protective cap having a release coating provided thereon which facilitates separation of the covering layer of floor fill.

Another object of this invention is to provide an improved protective cap which may receive a covering layer of fill of an overall thickness of up to 2⅜ inches (60.3 mm) and which presents an upper peripheral edge spaced below the upper surface of the floor fill by up to 1¾ inches (44.5 mm).

The present invention concerns a wire distributing floor structure of the type comprising a metal cellular subfloor presenting plural parallel cells and an overlying layer of floor fill, such as concrete, presenting a screed line or upper surface. A cell opening is presented in at least one of the cells. Void forming means, such as an underfloor access housing, encloses the cell opening and presents an outlet opening below the upper surface of the floor fill. A protective cap is provided which covers the outlet opening to protect the same from the concrete.

In accordance with the present invention, the protective cap may include a base secured to the void forming means and an upstanding peripheral wall having an upper peripheral edge spaced below the upper surface. A release coating is provided on those surfaces of the protective cap which will be juxtaposed with the subsequently poured concrete. The release coating prevents bonding of the concrete to the protective cap, thereby to facilitate breakout and removal of the covering layer of concrete to expose the protective cap for removal.

Further in accordance with the present invention, the coated protective cap may, due to dead load deflection of the beams, girders, and steel floor, be situated at depths many times greater than the maximum one-eight inch (3.2 mm) depth suggested by the prior art. For example, the upper peripheral edge of the cap may reside at a depth of up to 1¾ inches (44.5 mm) below the upper surface of the concrete, that is up to fourteen times the prior art suggested maximum depth. At the 1¾ inch (44.5 mm) depth, the covering layer of concrete may have a thickness from the cap base to the upper surface of the concrete of up to 2⅜ inches (60.3 mm). Notwithstanding the greater depth, the covering layer of concrete may be quickly broken out to provide a cavity having a peripheral edge requiring minimal, if any, regrouting.

DESCRIPTION OF THE PREFERRED EMBODIMENTS(S)

Figure 1:
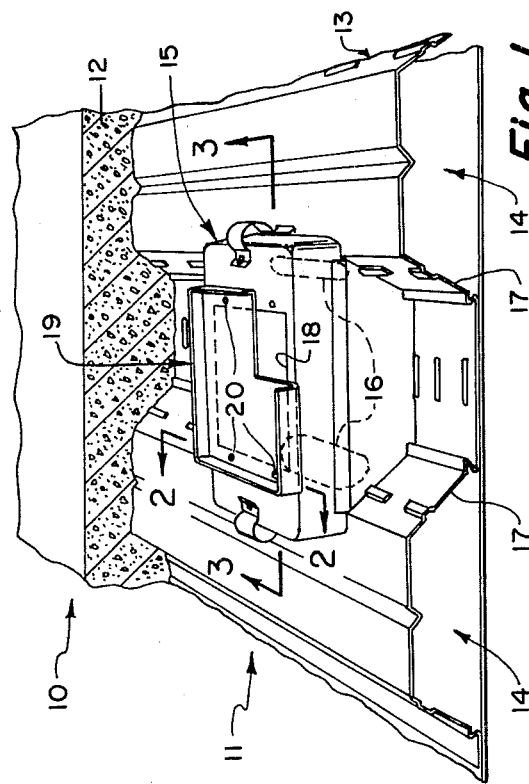
FIG. 1 is fragmentary perspective view of a cellular flooring unit having an underfloor access housing mounted thereon which incorporates the improved protective cap of this invention.
Figure 3:
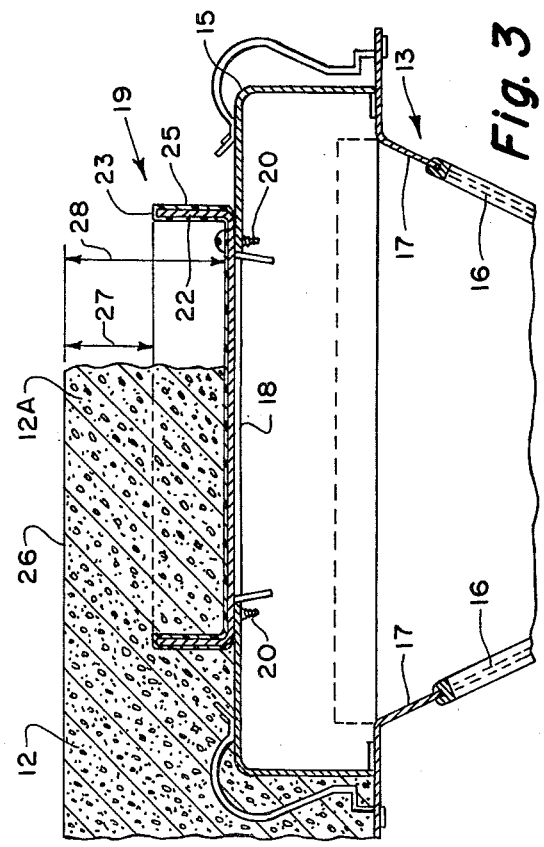
FIG. 3 is a cross-sectional view taken substantially along the line 3—3 of FIG. 1.

FIGS. 1 and 3 illustrate a floor structure 10 comprising a metal subfloor 11 covered by a layer of floor fill, such as concrete 12. The metal subfloor 11 includes metal cellular flooring units 13 providing plural, generally parallel, enclosed cells 14. The metal cellular flooring units 13 are co-mingled with sheet metal decking units (not illustrated) in a preselected pattern to allow for present and future distribution of electrical services throughout the floor structure 10.

Prior to pouring the concrete 12, plural void forming means 15 are provided at selected locations in the metal subfloor 13. The void forming means 15 encloses access openings 16 presented in the inclined webs 17 of the metal cellular flooring 13. Each of the access openings 16 provides communication between the interior of the void forming means 15 and the cells 14 of the flooring unit 13. The void forming means 15 also presents an outlet opening 18 in the top wall thereof. For a more complete description of the void forming means 15 and its arrangement relative to the metal cellular flooring 13, reference is directed to U.S. Pat. No. 3,932,696, supra, issued Jan. 13, 1976, and assigned to the assignee of the present invention.

PRESENT IMPROVEMENT

A protective cap 19 is secured, for example, by fasteners 20, to the void forming means 15 in capping relation with the outlet opening 18 to protect the same from the subsequently poured concrete 12. All of the capped outlet openings 18 are available for activation throughout the life of the building.

Figure 2:
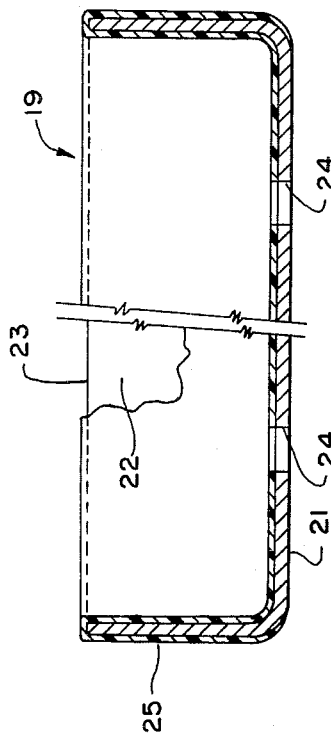
FIG. 2 is a broken cross-sectional view taken along the line 2—2 of FIG. 1, illustrating the present protective cap.

In accordance with the present invention, the protective cap 19 (FIG. 2) may include a base 21 and upstanding perimeter wall 22 presenting an upper perimeter edge 23. The base 21 is provided with openings 24 arranged to receive the fasteners 20 (FIG. 1).

A release coating 25 is provided on those faces of the base 21 and the perimeter wall 22 which will be juxtaposed with the concrete 12. The release coating 25 may be applied by brushing, dipping as well as other application methods. A material particularly useful as the release coating comprises a thermoplastic potting compound commercially available under the trade name CLIDERITE, from Thermo Cote, Inc., Patterson, New Jersey. Other release coating materials found useful in the present invention are two one-part polyurethane coatings commercially available under the trade name CHEMGLAZE II and identified as A074 and A276, from Hughson Chemicals, Lord Corporation, Erie, Pa..

It will be observed in FIG. 3 that the protective cap 19 is completely enveloped by the concrete 12. The release coating 25 being interposed between the protective cap 19 and the concrete 12 prevents bonding of the concrete 12 to the protective cap 19. The arrangement is such that for future access to electrical service, it is possible to locate beneath the concrete 12 a particular protective cap 19. Thereafter the covering layer 12A of concrete, that is that portion of the concrete 12 overlying the protective cap 19, is readily broken out to expose the protective cap 19 for removal. A suitable electrical floor outlet (not illustrated) may then be affixed to the void forming means 15.

Figure 4:
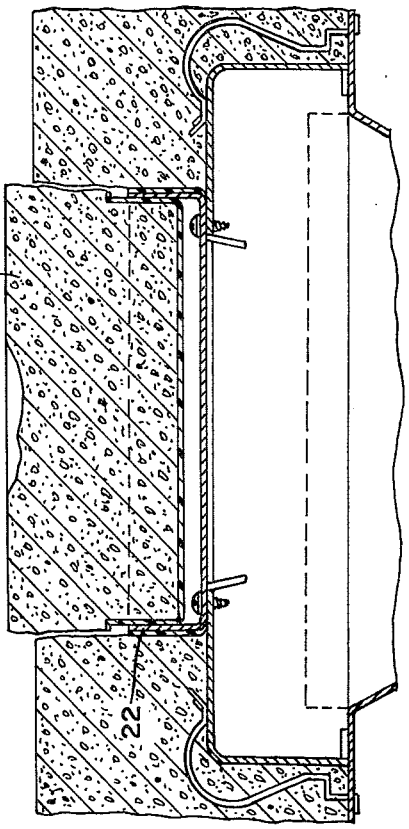
FIG. 4 is a cross-sectional view, similar to FIG. 3, illustrating fracturing and partial removal of the overlying fill.

It has been found that with the addition of the release coating 25, the upper perimeter edge 23 of the protective cap 19 may be spaced at a distance indicated by the dimension line 27 in FIG. 3, of up to 1¾ inches (44.5 mm) below the upper surface 26 of the concrete 12. Moreover, the covering layer 12A of concrete may have a thickness measured from the base 21 to the upper surface 26 — see dimension line 28 in FIG. — of up to 2⅜ inches (60.3 mm). Where the perimeter edge 23 is spaced at a distance of less than about 1/4 inch (6.4 mm) below the upper surface 26, the covering layer 12A of concrete may fracture cleanly along lines coincident with the perimeter wall 22, substantially as illustrated in FIG. 4, pop up, and may be removed as one piece. Where the perimeter edge 23 is spaced at a distance greater than 1/4 inch (6.4 mm) below the upper surface, the covering layer 12A of concrete will be broken into smaller pieces for removal.

I claim:

1. A wire distributing floor structure comprising:
   a metal cellular subfloor presenting plural parallel cells,
   an overlying layer of concrete presenting an upper surface,
   a cell opening in at least one of said cells,
   void forming means enclosing said cell opening and presenting an outlet opening below said upper surface,
   a protective cap covering said outlet opening to protect the same from said concrete, said protective cap comprising a base secured to said void forming means, and an upstanding perimeter wall having an upper perimeter edge spaced below said upper surface of said concrete, and
   a release coating provided on those surfaces of said protective cap juxtaposed with said concrete to prevent bonding of said concrete to said protective cap, thereby to facilitate breakout and removal of the overlying layer of concrete to expose said protective cap for removal.

2. The floor structure of claim 1 wherein said upper perimeter edge is spaced at a distance of up to 1¾ inches below said upper surface of said concrete.

3. The floor structure of claim 1 wherein said concrete has a thickness from said base to said upper surface of up to 2⅜ inches.

* * * * *